March 3, 1936.   O. H. BANKER   2,032,863
TORQUE TUBE SUPPORT
Filed Aug. 1, 1934
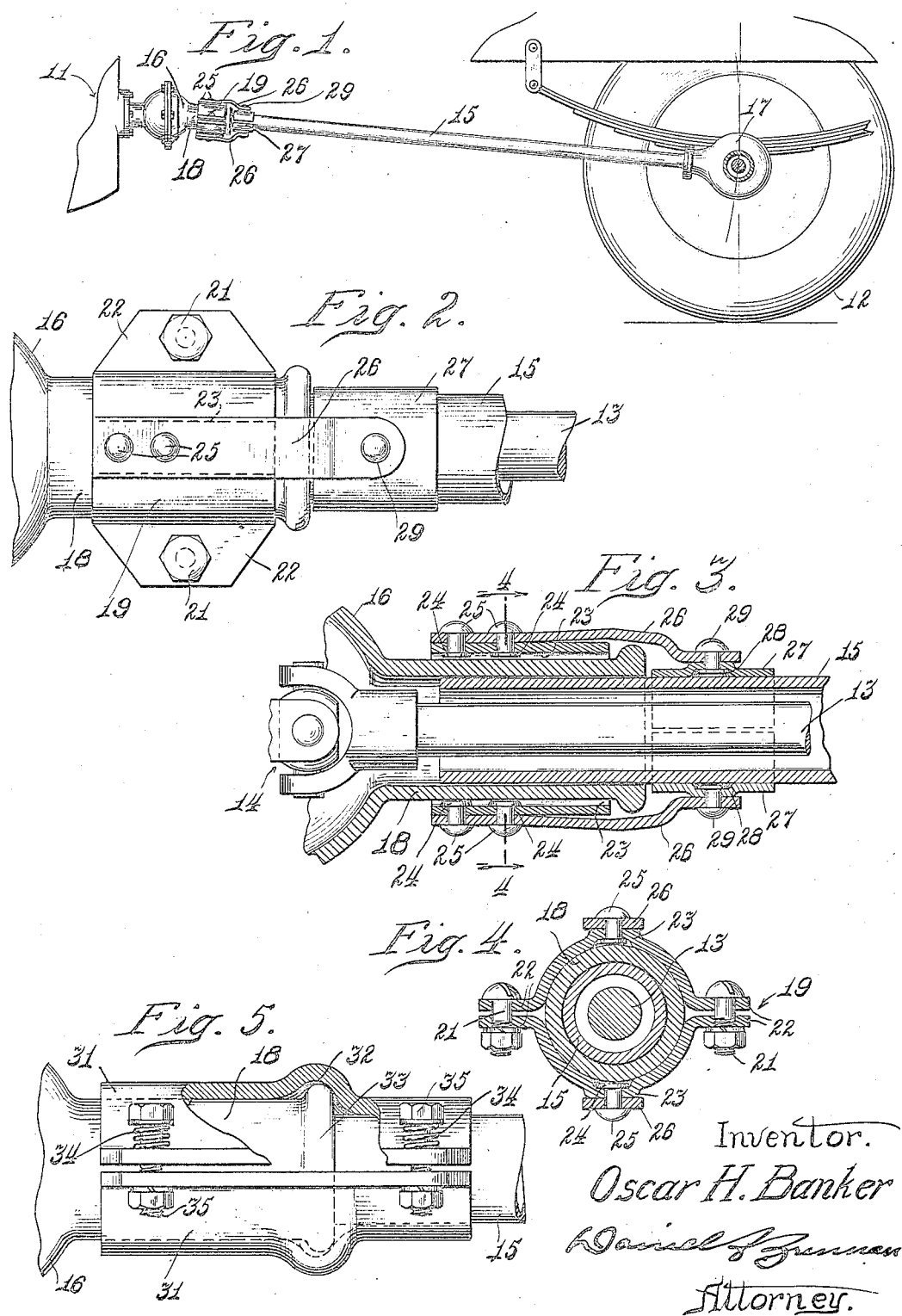
Inventor.
Oscar H. Banker
Daniel J. Brennan
Attorney.

Patented Mar. 3, 1936

2,032,863

UNITED STATES PATENT OFFICE 2,032,863

TORQUE TUBE SUPPORT

Oscar H. Banker, Chicago, Ill.

Application August 1, 1934, Serial No. 737,966

8 Claims. (Cl. 180—85)

The invention relates to improvements in automotive appliances and more particularly to an improved device adapted to support and eliminate unwarranted and annoying lateral movement of a drive shaft housing or torque tube relative to the bell housing enclosing a universal coupling into which housing one end of said tube slidably extends.

An object of the invention is to provide an improved torque tube support which securely holds the slidably mounted end of the torque tube against lateral movement relative to its mounting without preventing the necessary longitudinal sliding thereof.

Another object is to provide an anti-rattle device of the character described which obtains a tight grip of the automotive parts held thereby irrespective of wearing of said parts.

The foregoing and such other objects of the invention as will appear hereinafter as the description proceeds will be more readily understood from a perusal of the following specification, reference being had to the accompanying drawing, in which:

Fig. 1 is a fragmentary longitudinal vertical sectional view of a motor vehicle, showing one form of the improved support mounted on the torque tube and mounting.

Fig. 2 is an enlarged elevational view of the improved torque tube support shown mounted in place.

Fig. 3 is a longitudinal sectional view of the device, showing the torque tube and bell housing in section.

Fig. 4 is a transverse sectional view taken on line 4—4 of Fig. 3.

Fig. 5 is an elevational view, partly broken away, of another form of support or bracing clamp.

In commonly known motor vehicle construction a power plant 11 is located at the forward end of the vehicle for positively driving the rear wheels 12 through a drive shaft 13 which extends therebetween. The necessity of flexibility in the drive shaft connection, to allow relative movement of the wheel mounting and power plant, requires that one or more universal joints 14 be provided in said connection. Ordinarily both the drive shaft and the universal joint or joints are provided with a covering, and as shown in the accompanying drawing, said covering preferably consists of a torque tube 15 and a bell housing 16. One form of common construction, wherein but one universal joint is provided, requires the torque tube to be fixed relative to the rear wheel drive mechanism housing 17 and as said housing moves, upon vertical movement of the wheels over irregularities in the road bed, the forward end of said torque tube must be free to slide longitudinally relative to the bell housing 16 which supports its substantially free forward end. More particularly, the rear wheels and housing move vertically rather than through a vertical arc, substantially as illustrated, with the universal joint 14 as a pivot. Continuous reciprocable sliding movement of the free end of the torque tube resulting from such vertical movement causes wearing down of the end portion of the tube and of the reduced neck 18 of the bell housing in which said end is slidably mounted. The clearance thus developed between the two parts permits lateral movement of the torque tube relative to the bell housing to the annoyance of the occupants of the vehicle because of noises. The clearance between the slidably connected parts also is injurious to the universal joint because of grease leakage.

The improved device provides a new support or bearing for the worn free end of the torque tube without necessitating costly repairs or the replacement of parts. As shown, the device preferably includes a suitable two piece clamp 19 fitted over the reduced neck 18 of the bell housing and securely clamped in place by bolts 21 which extend through complemental flanges 22 provided one on each clamp part. Each clamp part has a longitudinal upset portion 23 to provide clearance on its inside face for the heads 24 of rivets 25 securing yieldable arms 26 thereto, one on each section. The arms 26 extend substantially parallel beyond the end of the bell housing neck 18 and each carries on its end one section of a two piece collar 27. Upon reference to Fig. 3 it will be noted that a shallow recess 28 preferably is provided in each collar section to receive the head of a rivet 29 securing said sections to their respective arms. The structure herein provided, because of the yieldability of the arms 26, securely clamps and supports the free end of the torque tube adjacent its original mounting and provides a new bearing surface therefore which rigidly holds the tube against unwarranted lateral movement without interfering with its free longitudinal sliding.

The structure shown in Fig. 5 consists of a longitudinally split tube comprising half sections 31 annularly grooved intermediate their ends, as at 32, to fit over the flanged end 33 of the bell housing neck 18. The inner diameter of the split tube is reduced at one end to fit over the torque tube, and springs 34, associated with the bolts 35, yieldingly urge the halves into tight engagement with the respective parts of the bell housing and of the torque tube without preventing longitudinal sliding of the tube. It is apparent that the tube may slide freely within the clamp and, should interference with such sliding be encountered, the clamp may slide upon the neck 18, its movement therealong being limited only by the flange 33 on said neck. Clearance developing between the torque tube or the housing neck and the clamp is automatically taken up by springs 34.

Although exemplary forms of the improved torque tube support have been shown in detail in the accompanying drawing, and described in detail in the foregoing specification, it is to be understood that the invention may embody such structure as falls within the spirit of the invention and the scope of the appended claims.

I claim:

1. A device of the character described comprising, in combination, a split clamp, a pair of diametrically opposed yieldable arms extending in the same direction from said clamp, and a two-part collar carried one part on each arm spaced from and in axial alignment with the clamp.

2. A torque tube support comprising a split mounting clamp having yieldable arms extending therefrom, and means on said arms providing a self-adjusting bearing for said torque tube to prevent lateral movement thereof.

3. A device of the character described comprising, in combination, a two part clamp, yieldable arms extending to one side of said clamp, one mounted on each part thereof, and a split collar, one section of said collar being mounted on the free end of each arm.

4. A device of the character described comprising, a two-part clamp, yieldable arms riveted at one end one to each part of said clamp, said arms extending substantially parallel to each other beyond one face of said clamp, and a split collar having one section riveted to the free end of each arm.

5. A device of the character described comprising, a two-part clamp, yieldable arms riveted at one end one to each part of said clamp, said arms extending substantially parallel to each other beyond one face of said clamp, and a split collar having one section riveted to the free end of each arm, said clamp parts and collar sections each being upset to provide a recess therein for the rivet heads whereby the inner surfaces thereof are unobstructed thereby.

6. A device adapted for attachment to a housing having a neck of reduced diameter slidably fitted over one end of a shaft housing comprising, in combination, a split clamp adapted to be rigidly secured around said neck, yieldable arms extending beyond the end of said neck one on each section of said split clamp, and a two-part collar, one part carried on each arm adapted to embrace and yieldably retain the shaft housing rigid.

7. A device adapted to retain a slidably mounted torque tube substantially rigid relative to its bearing comprising, in combination, a clamp adapted to be mounted securely over the bearing, yieldable arms extending beyond said bearing overlying diametrically opposed sides of said torque tube, and collar segments mounted one on the free end of each arm adapted to embrace said torque tube and prevent lateral movement thereof relative to said bearing.

8. A stabilizing means for torque tubes comprising a pair of clamping members adapted to engage tightly about the torque tube bearing, a pair of collar segments adapted to slidingly embrace a torque tube telescoping into said bearing, and yieldable means connecting the collar segments one to each clamping member adapted to hold said collar segments tightly against said torque tube.

OSCAR H. BANKER.